P. PHILLIP.
GOVERNOR.
APPLICATION FILED MAY 18, 1917.
1,380,588.
Patented June 7, 1921.
2 SHEETS—SHEET 2.
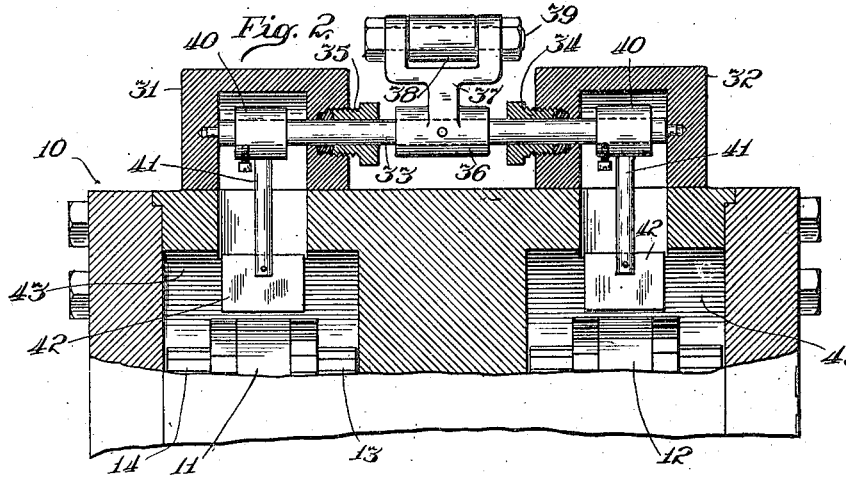
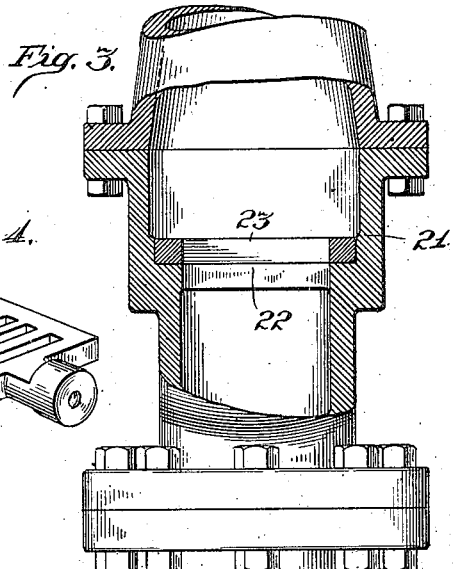
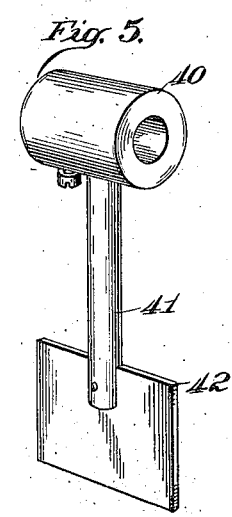
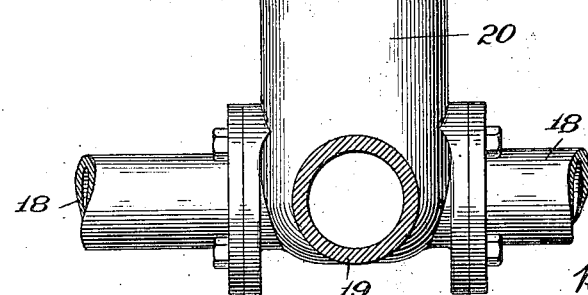
Witnesses
Milton Lenoir
C. A. Scans
Inventor
Peter Phillip
by Offield Toole Graves & Offield
Attorneys

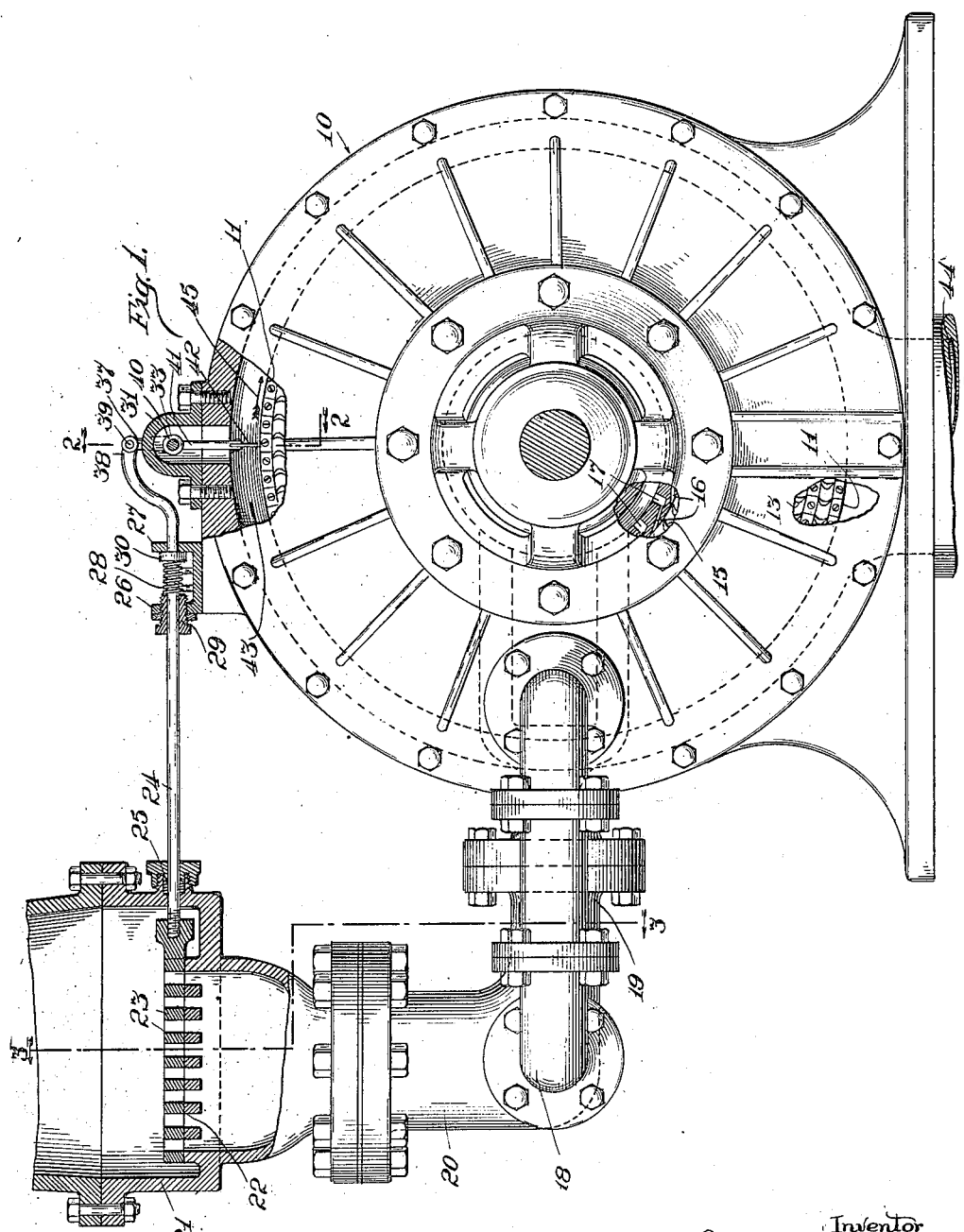

UNITED STATES PATENT OFFICE.

PETER PHILLIP, OF CHICAGO, ILLINOIS.

GOVERNOR.

1,380,588. Specification of Letters Patent. Patented June 7, 1921.

Application filed May 18, 1917. Serial No. 169,436.

*To all whom it may concern:*

Be it known that I, PETER PHILLIP, a citizen of the United States, residing at Chicago, in the county of Cook and State of Illinois, have invented certain new and useful Improvements in Governors, of which the following is a specification.

My invention relates to improvements in governors, and, although capable of many applications, it is of particular service in connection with turbines.

The principal object of the invention is to provide a governor so organized that a difference in the flow of the turbine motive fluid incident to a change in the speed of the turbine, automatically effects a change in the amount of motive fluid supplied to the turbine so as to compensate for such change in speed.

In order to describe my invention, I select as an illustration of its application a steam turbine of the outward radial flow type equipped with my invention.

In the drawings illustrating said invention—

Figure 1 is a side elevation of the turbine, governor, and associated parts, certain portions of the outer casing being shown broken away in order better to illustrated the construction;

Fig. 2 is a section taken on the line 2—2 of Fig. 1;

Fig. 3 is a section taken on the line 3—3 of Fig. 1;

Fig. 4 is a perspective view of the gridiron valve forming a part of the throttling arrangement; and Fig. 5 is a view of the governing deflector or vane.

Referring to the drawings, 10 represents as a whole a turbine which, in its structural details, is the same as the turbine described in my copending application executed of even date herewith. As shown best in Fig. 2, said turbine embodies a pair of duplex rotors 11 and 12 provided with blades 13 on either side of each rotor, said rotor blading coöperating with stationary blades 14 rigidly secured inthe sides of the casing facing the side faces of the rotors 11 and 12.

Referring to Fig. 1, it will be seen that the motive fluid is directed upon four sets of inner rows of rotor blading 15 through jet orifices 16 communicating through transverse ports 17 with a set of four annular steam chests, the details of which are not shown in this application.

Live steam is supplied to the steam chests through a pair of side supply pipes 18 and a central supply pipe 19, all of which pipes communicate with a main steam pipe 20. The said steam pipe 20 conducts live steam from an enlarged throttle valve chamber 21 having a flat ported valve surface 22 with which coöperates a gridiron valve 23 of conventional design. Said gridiron valve 23 is operated by a rod 24 which enters the throttle valve chamber 21 through a suitably packed gland 25. The outer end of the rod 24 is guided in a pair of suitable supports 26 and 27 secured to the casing of the turbine, and is forced outwardly away from the valve chamber 21 by means of a coil compression spring 28, one end of which presses against the guide bushing 29 and the other end against the collar 30 pinned to said rod 24. The outward movement of the rod 24 is limited, by reason of the fact that the spring 28 presses the fixed collar 30 tightly against the supporting guide 27.

On the top of the turbine is bolted a pair of small semi-circular housings 31 and 32, into which housings project opposite ends of a pivotally mounted rock shaft 33, the openings into said housings 31 and 32 being fitted with suitable packed glands, as at 34 and 35. Between the said glands 34 and 35 and on the shaft 33 is pinned the hub 36 of a small arm 37, forked, as shown in Fig. 2, in order to admit the enlarged bent-up end 38 of the rod 24 which is articulated upon the pivot screw 39 mounted in the forks of the said arm 37. In the housings 31 and 32 and on the opposite ends of the said shaft 33 I key or pin the hubs 40, which have depending integral arms 41 on the lower extremities of which are secured a pair of vanes or deflectors 42, the said deflectors 42 projecting down into the space 43 (see also Fig. 1) between the outer circumference of the rotor and the inner periphery of the turbine casing.

Describing the operation of the device, it will be understood that under ordinary conditions, when the turbine is operating at maximum load, the gridiron throttle valve 23 is in the position shown in Fig. 1,—that is to say, open to its fullest extent. Under such conditions, it will also be understood that the vanes of the turbine are so shaped as to discharge or throw off the exhaust steam in a direction substantially radially with respect to the turbine casing, the exhaust steam passing out around the spaces 43 and finally through the common exhaust pipe 44 to the condenser or other arrangement for disposing of the spent motive fluid. There will of course be a certain amount of flow of the exhaust stem past the deflectors 42 in the direction of the arrow 45, which is in the direction of rotation of the turbine, due to the fact that the turbine is of course not ideal or theoretically perfect in its operation, and, furthermore, because of the fact that the rapidly moving rotor and blading carried thereby will cause a drag upon the steam in the direction of rotation. Thus, under such normal conditions of maximum load, the exhaust steam will press against the deflectors 42 and tend to move the same in the direction of the arrow 45, such tendency, however, being normally resisted by the coil spring 28. When, however, the load on the turbine decreases, thereby permitting its speed to increase, conditions will be changed in two respects: First, the speed of the turbine will rise above that figure necessary to produce an ideal efficiency and radial discharge of the spent fluid, which will tend to be discharged in the direction of rotation of the turbine; and, secondly, the increase in speed of the turbine will cause an increased drag upon the exhaust steam, due to increased friction with the surface of the rotor and moving blading; thus, the exhaust steam entering the spaces 43, will tend to move more rapidly in the direction of the arrow 45, causing a greater pressure on the deflectors 42. Such increased pressure on the deflectors 42 will cause the rod 24 to move rearwardly against the pressure of the spring 28, closing, or partially closing, the gridiron throttle valve 23. The supply of motive fluid being thus reduced, the turbine will slow down until a condition of equilibrium is reached, the whole operation being automatic.

In view of the above description, it is thought to be unnecessary to enlarge upon the many advantages of the arrangement described, which is extremely efficient in carrying out the object of the invention with a construction which is of extremely simple design. It is of course understood that in certain cases it may be advisable to use an indirect control upon the deflector arms 42 and the gridiron valve 23 in order to overcome the friction of the latter; for instance, the arrangement disclosed in United States patent to Sturgess, No. 863,235, may be used with advantage in this connection.

Inasmuch as the described details of construction may be changed or modified to suit individual requirements, without loss of efficiency or other advantages, it must be understood that the said details are merely illustrative of my invention, the scope of which must be determined by reference to the appended claims.

I claim—

1. The combination with a fluid operated turbine having a rotor with a circular series of vanes operated on by the motive fluid for imparting rotation to the rotor, of governing mechanism including an actuating member adjacent the path of movement of said vanes and adapted for movement in a direction corresponding to the direction of movement of the adjacent vanes so as to be displaced by the motive fluid as it leaves said vanes of the rotor.

2. The combination with an outward radial flow turbine provided with an inclosing casing having an exhaust aperture, of governing mechanism including an actuating member therefor operated upon by fluid flowing between the outer vanes of said turbine and the exhaust aperture.

3. The combination of a turbine casing provided with an exhaust aperture, an outward flow rotor in said casing provided with an outer row of vanes spaced apart from the interior of said casing, thereby providing a circumferentially extending passage for the exhaust gases, and governing mechanism, including a vane, in said passage and movably controlled by change in the flow of exhaust fluid traveling through said passage.

4. In a turbine of the outward radial flow type, the combination of an inclosing circumferentially extending casing, a rotor in said casing provided with an outer row of blades spaced apart from the wall of said casing, said casing being provided with a single exhaust aperture, and governing mechanism including a throttle valve and means for actuating the same comprising a vane extending into the passage between the turbine blades and the casing and operated upon by the exhaust fluid issuing from said blades on its way to the exhaust aperture.

5. The combination with a fluid operated turbine, of a rotor, a casing therefor, means for supplying motive fluid into the casing for operating the rotor and a governing mechanism including an actuating member in the casing in the path of movement and operated by the motive fluid as it is discharged from the rotor.

6. The combination with a fluid operated turbine comprising a rotor and a casing therefor, of a duct for supplying motive fluid to the interior of the casing for operating the rotor, a member pivotally mounted on the casing and projecting therein adjacent the rotor so as to be displaced by the motive fluid as it exhausts from the rotor into the casing, and a valve in the aforesaid duct regulated by said member.

PETER PHILLIP.